United States Patent
Vermeiren et al.

(10) Patent No.: US 7,283,219 B2
(45) Date of Patent: Oct. 16, 2007

(54) INTERPRETATION SYSTEM FOR INTERPRETING REFLECTOMETRY INFORMATION

(75) Inventors: Tim Vermeiren, Zele (BE); Tom Bostoen, Brugge St. Andries (BE); Leonard Pierre Van Biesen, Aalst (BE); Frank Louage, Putte (BE); Patrick Jan Marie Boets, Heffen (BE)

(73) Assignee: ALCATEL, Paris (FR)

( * ) Notice: Subject to any disclaimer, the term of this patent is extended or adjusted under 35 U.S.C. 154(b) by 386 days.

(21) Appl. No.: 10/625,629

(22) Filed: Jul. 24, 2003

(65) Prior Publication Data

US 2004/0019451 A1    Jan. 29, 2004

(30) Foreign Application Priority Data

Jul. 26, 2002    (EP) .................................. 02291902

(51) Int. Cl.
*G01N 21/00*    (2006.01)
(52) U.S. Cl. ...................................... 356/73.1
(58) Field of Classification Search ..................... None
See application file for complete search history.

(56) References Cited

U.S. PATENT DOCUMENTS

| | | | |
|---|---|---|---|
| 4,630,228 A | | 12/1986 | Tarczy-Hornoch et al. |
| 5,128,619 A | * | 7/1992 | Bjork et al. ................ 324/533 |
| 6,745,137 B2 | * | 6/2004 | Krishnamachari et al. .... 702/57 |
| 6,825,672 B1 | * | 11/2004 | Lo et al. ..................... 324/533 |

FOREIGN PATENT DOCUMENTS

| | | |
|---|---|---|
| EP | 0391312 A2 | 10/1990 |
| WO | WO 01/01158 A1 | 1/2001 |

* cited by examiner

*Primary Examiner*—Tu T. Nguyen
(74) *Attorney, Agent, or Firm*—Sughrue Mion, PLLC

(57) ABSTRACT

Interpretation systems for interpreting reflectometry information are provided with modules for making interpretations, with each module comprising a generating module-part, a testing module-part, and a debugging module-part, and with one module being a generating system-part for a next module and with said next module being a testing system-part and a debugging system-part for said one module, to introduce improved intelligence. These interpretation systems have double-level Generate-Test-Debug (GTD) structures, two at module level as well as one at system level. This improved intelligence can be further improved by introducing a third module resulting in three GTD structures at module level and two GTD structures at system level. Interpretations are pulse-based, energy-based, simulation-based for rough, medium, and precise interpretation for increasing the efficiency of the improved intelligence.

23 Claims, 2 Drawing Sheets

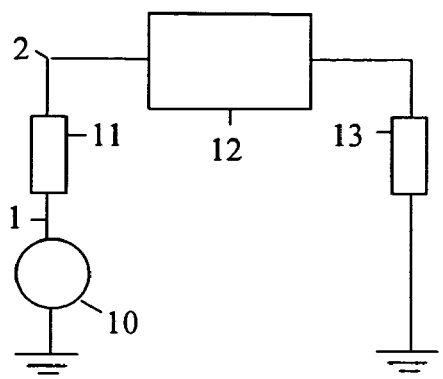
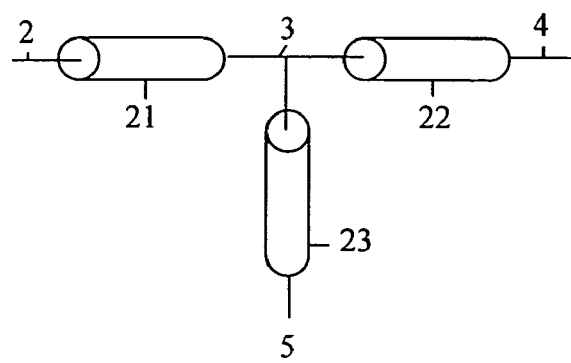
Fig. 2a              Fig. 2b
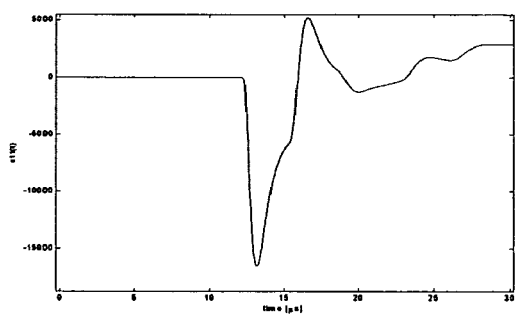
Fig. 2c
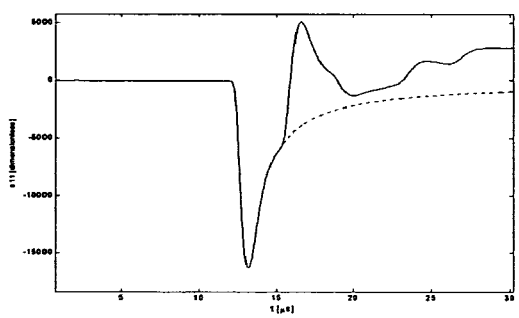
Fig. 2d
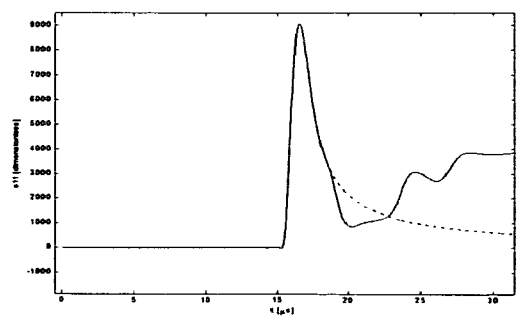
Fig. 2e

INTERPRETATION SYSTEM FOR INTERPRETING REFLECTOMETRY INFORMATION

FIELD OF THE INVENTION

The invention relates to interpretation systems and more particularly to an interpretation system for interpreting reflectometry information.

BACKGROUND OF THE INVENTION

A prior art interpretation system is known from WO 01/01158, which discloses a method and a system for determining the make up of a subscriber loop by sending pulses onto the loop and acquiring data based on received echo signals. The known interpretation system is disadvantageous, inter alia, due to comprising limited intelligence.

SUMMARY OF THE INVENTION

It is an object of the invention, inter alia, of providing an interpretation system as defined in the preamble which comprises more intelligence.

The interpretation system according to the invention is characterized in that said interpretation system comprises at least a first module for making a first interpretation and a second module for making a second interpretation, with each module comprising a generating module-part, a testing module-part and a debugging module-part, and with said first module being a generating system-part for said second module and with said second module being a testing system-part and a debugging system-part for said first module.

By providing, at module level, each module with the generating module-part, the testing module-part and the debugging module-part, each module has got a so-called Generate-Test-Debug-structure or GTD-structure at module level. This GTD-structure itself is of common general knowledge, with the G-block receiving (input information) signals from an input unit and supplying (solution) signals to the T-block, with the T-block receiving (solution) signals from the G-block and supplying (solution+error report) signals to the D-block and generating (output information) signals for an output unit, and with the D-block supplying (correction) signals to the G-block and supplying (new solution) signals to the T-block and generating (correction) signals for said input unit. By further providing, at system level, the interpretation system with the generating system-part, the testing system-part and the debugging system-part, the interpretation system has also got a GTD-structure, but at system level, with said first module having the G-function and said second module having the T-function and the D-function. As a result, the interpretation system has got improved (for example artificial) intelligence.

The invention is based upon an insight, inter alia, that improved intelligence can be created by introducing GTD-structures at two or more levels, and is based upon a basic idea, inter alia, that each module should get this GTD-structure at module level, and that at least one GTD-structure at system level can be realized by giving said first module the G-function and giving said second module the T-function and the D-function of this GTD-structure.

The invention solves the problem, inter alia, of providing an improved interpretation system as defined in the preamble, and is advantageous, inter alia, in that an interpretation system with higher intelligence will be more efficient than the interpretation system known so far.

A first non-limiting embodiment of the interpretation system according to the inventions is advantageous in that said interpretation system comprises at least a third module for making a third interpretation, with said third module comprising a generating module-part, a testing module-part and a debugging module-part, and with said second module being a generating system-part for said third module and with said third module being a testing system-part and a debugging system-part for said second module.

By providing, at module level, said third module with the generating module-part, the testing module-part and the debugging module-part, the third module has got a so-called Generate-Test-Debug-structure or GTD-structure at module level. By further providing, at system level, the interpretation system with the generating system-part, the testing system-part and the debugging system-part, the interpretation system has also got a further GTD-structure, but at system level, with said second module having the G-function and said third module having the T-function and the D-function. As a result, the interpretation system has got further improved (for example artificial) intelligence.

A second non-limiting embodiment of the interpretation system according to the inventions is advantageous in that said first interpretation is a pulse-based interpretation, with said second interpretation being an energy-based interpretation, and with said third interpretation being a simulation-based interpretation.

By introducing at least three interpretations, a first pulse-based one for rough interpretation, a second energy-based one for medium interpretation, and a third simulation based one for precise interpretation, in addition to the five GTD-structures, a sixth mechanism has been introduced for causing the interpretation system to evolve to the best interpretation at the highest efficiency.

A third non-limiting embodiment of the interpretation system according to the inventions is advantageous in that said interpretation system comprises at least one processor, with said modules, module-parts and system-parts being software to be run via said at least one processor.

Such an interpretation system is a rule based expert system comprising many like for example fifty or one hundred or five hundred rules for making said interpretations.

A fourth non-limiting embodiment of the interpretation system according to the inventions is advantageous in that said generating module-part of said first module receives measurement-feature information and/or topology information from a feature extraction and belief network module, with said debugging module-part of said first module sending wrong-topology information and/or noise information to said feature extraction and belief network module and with said testing module-part of said first module sending peak-explanation information and line-delay information to said generating module-part of said second module.

Said feature extraction and belief network module generates the measurement-feature information and generates the topology information. Said measurement-feature information for example comprises the start position of a peak and amplitude at this position, the position of its maximum and/or minimum and the amplitude at this position, the ending position of the peak and amplitude at this position, the energy, the rest energy etc. Said topology information for example comprises codes defining the topology, the number of segments, the number of taps etc. Said peak-explanation information is the result of the first (rough) interpretation and for example comprises information explaining (due to being interpreted roughly) each peak etc., and said line-delay information is the result of the first (rough) interpretation and for example comprises information estimating (due to being interpreted roughly) the line delay etc.

A fifth non-limiting embodiment of the interpretation system according to the inventions is advantageous in that said testing module-part of said second module sends line-parameter information to said generating module-part of said third module, with said debugging module-part of said second module sending impossible-peak-explanation information to said generating module-part of said first module.

Said line-parameter information is the result of the second (medium) interpretation and for example comprises information estimating (due to being interpreted mediumly) the attenuation etc.

A sixth non-limiting embodiment of the interpretation system according to the inventions is advantageous in that said testing module-part of said third module sends line-delay information and/or line-definition information to a signal identification module, with said generating module-part of said third module receiving wrong-solution information from said signal identification module, and with said debugging module-part of said third module sending wrong-parameter-range information to said generating module-part of said second module.

Said line-delay information and said line-definition information are the result of the third (precise) interpretation and for example comprise information defining (due to being interpreted precisely) the line delays and the line-definitions (like for example line-diameters) etc.

The invention also relates to a telecommunication system comprising an interpretation system for interpreting reflectometry information.

Such a telecommunication system for example corresponds with a telephone exchange or with an access multiplexer like a Digital Subscriber Line (DSL) access multiplexer etc.

The telecommunication system according to the invention is characterized in that said interpretation system comprises at least a first module for making a first interpretation and a second module for making a second interpretation, with each module comprising a generating module-part, a testing module-part and a debugging module-part, and with said first module being a generating system-part for said second module and with said second module being a testing system-part and a debugging system-part for said first module.

The invention further relates to a method for interpreting reflectometry information.

The method according to the invention is characterized in that said method comprises at least a first step of making a first interpretation and a second step of making a second interpretation, with each step comprising a generating substep, a testing substep and a debugging substep, and with said first step being a generating step for said second step and with said second step being a testing step and a debugging step for said first step.

The invention also further relates to a processor program product for interpreting reflectometry information.

The processor program product according to the invention is characterized in that said processor program product comprises at least a first function of making a first interpretation and a second function of making a second interpretation, with each function comprising a generating subfunction, a testing subfunction and a debugging subfunction, and with said first function being a generating function for said second function and with said second function being a testing function and a debugging function for said first function.

Embodiments of the telecommunication system according to the invention, of the method according to the invention and of the processor program product according to the invention correspond with the embodiments of the interpretation system according to the invention.

BRIEF DESCRIPTION OF THE DRAWINGS

The objects and features of the invention will become more apparent from the consideration of the following detailed description taken in conjunction with the accompanying drawings in which:

FIG. 2a is a block diagram illustrating a test set up for a network to be tested by embodiments of the interpretation system according to the inventions;

FIG. 2b is a block diagram illustrating a network to be tested by embodiments of the interpretation system according to the inventions;

FIG. 2c is a reflectogram to be interpreted by embodiments of the interpretation system according to the inventions;

FIG. 2d is a reflectogram illustrating a first detected peak and the extrapolation of its influence that will be removed; and FIG. 2e is a reflectogram illustrating a second detected peak and the extrapolation of its influence that will be removed.

DETAILED DESCRIPTION

Figure 1:
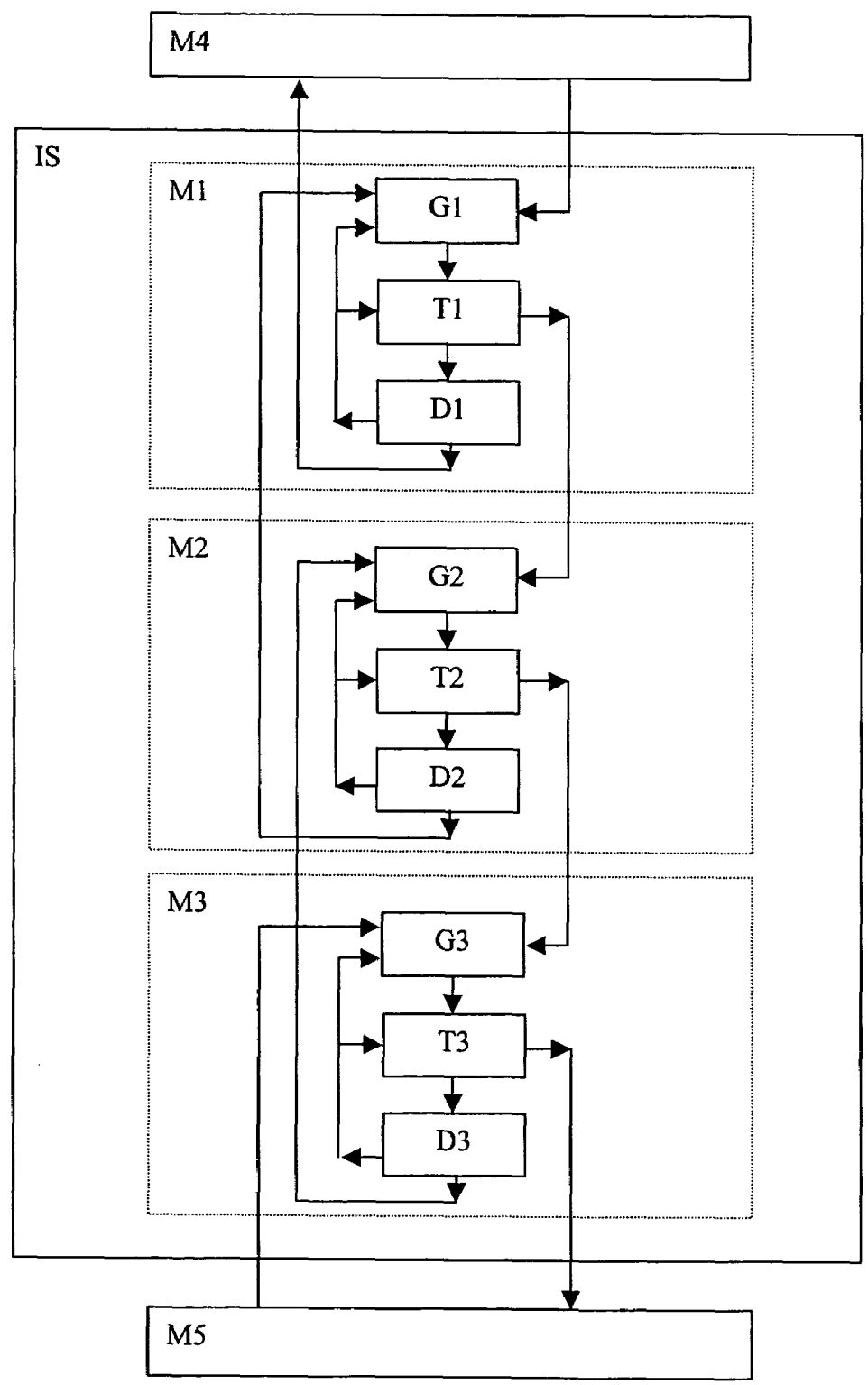
FIG. 1 is a block diagram illustrating an interpretation system according to non-limiting embodiments of the inventions.

The interpretation system IS shown in FIG. 1 comprises three modules M1, M2 and M3, with each module M1,M2,M3 respectively comprising a generating module-part G1,G2,G3 respectively, a testing module-part T1,T2,T3 respectively and a debugging module-part D1,D2,D3 respectively.

So, each module M1,M2,M3 has got a so-called Generate-Test-Debug-structure or GTD-structure at module level. This GTD-structure itself is of common general knowledge, with the G-block receiving (input information) signals from an input unit and supplying (solution) signals to the T-block, with the T-block receiving (solution) signals from the G-block and supplying (solution+error report) signals to the D-block and generating (output information) signals for an output unit, and with the D-block supplying (correction) signals to the G-block and supplying (new solution) signals to the T-block and generating (correction) signals for said input unit.

For module M1, said input unit is a feature extraction and belief network module M4 for generating and supplying input signals like measurement-feature information and/or topology information to the generating module-part G1, which generates and supplies signals like peak-explanation information to the testing module-part T1. This testing module-part T1 generates and supplies output signals like peak-explanation information and line-delay information to said output unit being for module M1 the generating module-part G2 (or in other words module M2). The debugging module-part D1 generates and supplies correction signals like wrong-topology information and/or noise information to said feature extraction and belief network module M4. Said feature extraction and belief network module M4 is of common general knowledge to a person skilled in the art.

For module M2, said input unit is the testing module-part T1 (or in other words module M1) for generating and supplying input signals like peak-explanation information and line-delay information to the generating module-part G2, which generates and supplies signals to the testing module-part T2. This testing module-part T2 generates and supplies output signals like line-parameter information to said output unit being for module M2 the generating module-part G3 (or in other words module M3). The debugging module-part D2 generates and supplies correction signals like impossible-peak-explanation information to said generating module-part G1 (or in other words module M1).

For module M3, said input unit is the testing module-part T2 (or in other words module M2) for generating and supplying input signals like peak-explanation information and line-parameter information to the generating module-part G3, which generates and supplies signals to the testing module-part T3. This testing module-part T3 generates and supplies output signals like line-delay information and/or line-definition information to said output unit being for module M3 a signal identification module M5. This signal identification module M5 generates and supplies correction signals like wrong-solution information to the generating module-part G3 (or in other words to module M3). The debugging module-part D3 generates and supplies correction signals like wrong-parameter-range information to said generating module-part G2 (or in other words module M2). Said signal identification module M5 is of common general knowledge to a person skilled in the art.

Module M1 makes a first interpretation for example in the form of a pulse-based interpretation, with module M2 making a second interpretation for example in the form of an energy-based interpretation, and with module M3 making a third interpretation for example in the form of a simulation-based interpretation. The first pulse-based one is for example a rough interpretation, a second energy-based one is for example a medium interpretation, and a third simulation based one is for example a precise interpretation.

Said measurement-feature information for example comprises the start position of a peak and amplitude at this position, the position of its maximum and/or minimum and the amplitude at this position, the ending position of the peak and amplitude at this position, the energy, the rest energy etc. Said topology information for example comprises codes defining the topology, the number of segments, the number of taps etc. Said peak-explanation information is the result of the first (rough) interpretation and for example comprises information explaining (due to being interpreted roughly) each peak etc., and said line-delay information is the result of the first (rough) interpretation and for example comprises information estimating (due to being interpreted roughly) the line delay etc.

Said line-parameter information is the result of the second (medium) interpretation and for example comprises information estimating (due to being interpreted mediumly) the attenuation etc.

Said line-delay information and said line-definition information are the result of the third (precise) interpretation and for example comprise information defining (due to being interpreted precisely) the line delays and the line-definitions (like for example line-diameters) etc.

At system level, the module M1 forms a generating system-part for the module M2, and the module M2 forms a testing system-part and a debugging system-part for the module M1. And the module M2 forms a generating system-part for the module M3, and the module M3 forms a testing system-part and a debugging system-part for the module M2. As a result of the double level GTD-structure, at module level as well as at system level, the interpretation system IS has got a well functioning improved (for example artificial) intelligence for interpreting reflectometry information more intelligently than ever has been done before.

Interpretation system IS will further comprise at least one processor not shown, with said modules, module-parts and system-parts being software to be run via said at least one processor. This interpretation system IS will be a rule based expert system comprising many like for example fifty or one hundred or five hundred rules for making said interpretations.

The invention is based upon an insight, inter alia, that improved intelligence can be created by introducing GTD-structures at two or more levels, and is based upon a basic idea, inter alia, that each module should get this GTD-structure at module level, and that at least one GTD-structure at system level can be realized by giving said first module the G-function and giving said second module the T-function and the D-function of this GTD-structure.

The invention solves the problem, inter alia, of providing an improved interpretation system as defined in the preamble, and is advantageous, inter alia, in that an interpretation system with higher intelligence will be more efficient than the interpretation system known so far.

The test set up in FIG. 2a discloses a generator source 10 located between ground and a generator impedance 11 which is further coupled to a first side of network 12, with a termination 13 being located between ground and a second side of said network 12. A common point 1 couples generator source 10 and generator impedance 11, and a common point 2 couples generator impedance 11 and network 12. The network 12 to be tested by the interpretation system IS discloses in FIG. 2b a first line 21, a second line 22 and a third line 23, with a common point 3 coupling these three lines 21,22,23, and with the other side of line 21 being point 2, and with the other side of line 22 being point 4 and with the other side of line 23 being point 5.

FIG. 2c illustrates a basic reflectogram for example resulting from analyzing network 12 as shown in FIGS. 2a and 2b, and FIGS. 2d and 2e respectively illustrate reflectograms for example generated by module M4 when analyzing said basic reflectogram by detecting and extrapolating first and second peaks respectively.

The network 12 as shown in FIGS. 2a and 2b is called a line with a bridged tap or LTL. This network 12 has three reflection points when starting at point 2: point 3=begin tap, point 4=end loop and point 5=end tap. Table 1 shows the properties for this test case.

TABLE 1

Test case properties

|  | Length [m] | Cable type | Exact delay [µs] |
| --- | --- | --- | --- |
| Line (1) | 1200 | Poly-ethylene 0.4 mm | 6.0136 |
| Line (2) | 1000 | Poly-ethylene 0.4 mm | 5.0113 |
| Line (3) | 300 | Poly-ethylene 0.4 mm | 1.5034 |

The reflectogram for this case is depicted in FIG. 2c. FIG. 2d depicts the first detected peak and the extrapolation of its influence that will be removed. The resulting signal after the removal of the first peak (P1) is used to detect the second peak (P2) and remove its influence, see FIG. 2e.

The feature extraction part of module M4 repeats this detect-and-remove-influence principle and finally generates for example the following properties of the basic reflectogram as shown in table 2.

TABLE 2

Selection of extracted features

| Peak | Type | Start [µs] | Energy |
|------|------|------------|--------|
| P1 | 'min' | 12.313 | 1.2335e+010 |
| P2 | 'max' | 15.597 | 4.1848e+009 |
| P3 | 'min' | 18.880 | 8.5827e+007 |
| P4 | 'max' | 23.183 | 2.5651e+008 |

The belief network part of module M4 makes a probabilistic inference of the possible topology based on the detected features and finds LTL as most likely topology. This information together with the information in table 2 will be the input signals generated by module M4 and supplied to generating module-part G1 (or in other words to module M1) as shown in FIG. 1.

Generating module part G1 will in response to said input signals generate an internal representation of the reflectogram and then it will try to match this representation with the found features. Based on the supplied topology LTL it will generate a list with the following reflected waves: $w_{11}$, $w_{1221}$, $w_{1331}$, $w_{133331}$, $w_{122221}$, $w_{122331}$, $w_{133221}$, .... Each subscript indicates which lines have been traveled. The interpretation system IS will now try to match the properties of P1, P2, P3 and P4 with the reflected waves via the three modules M1, M2 and M3 each having a GTD-structure at module level, with at system level said first modules M1 having a G-function and with said second module M2 having a T-function and a D-function, and with at system level said second modules M2 having a G-function and with said third module M3 having a T-function and a D-function.

Generating module-part G1 will make the following associations and/or calculations:

P1 corresponds with $w_{11}$. This implies that the delay of the first line $$21 = \frac{StartP1}{2} = \frac{12.313}{2} = 6.1565 \text{ µs}$$

as $w_{11}$ travels twice the length of first line 21.

P2 corresponds with $w_{1331}$. This implies that the delay of the third line $$23 = \frac{StartP2 - StartP1}{2} = \frac{15.597 - 12.313}{2} = 1.642 \text{ µs}$$

P3 corresponds with $w_{1221}$. This implies that the delay of the second line $$22 = \frac{StartP3 - StartP1}{2} = \frac{18.880 - 12.313}{2} = 3.2835 \text{ µs}$$

Generating module-part G1 will supply said results to testing module-part T1.

Testing module-part T1 will test these associations and/or calculations by for example checking the number of peaks, the number of associations, the signs etc., and will generate the following test report:
P4 not associated with any reflected waves
Sign P3 is not correct.

Testing module-part T1 will supply said results to debugging module-part D1.

Debugging module-part D1 will debug these results by for example coming up with an association for P4 etc. and will generate the following debug report:
P4 corresponds with $w_{122331}+w_{133221}$ as the delay for traveling second line 22 and third line $$23 = \frac{StartP4 - StartP1}{2} = \frac{23.183 - 12.313}{2} = 5.435 \text{ µs} \approx 3.2835 + 1.642 \text{ µs} = 4.9255 \text{ µs}$$

This debugged result is sent back to the testing module-part T1.

Testing module-part T1 will test again now based upon the added and/or adapted associations and/or calculations, and will generate the following test report:
Sign P3 is not correct.

Debugging module-part D1 cannot improve this situation and will inform said testing module-part T1 correspondingly.

Testing module-part T1 will then inform generating module-part G2 (or in other words module M2) about this best possible explanation and will supply the current solution to module M2. This solution is:
P1 corresponds to w11
P2 corresponds to w1331
P3 corresponds to w1221
P4 corresponds to w122331+w133221
Delay first line 21=6.1565 µs
Delay second line 22=1.642 µs
Delay third line 23=3.2835 µs Generating module-part G2 will make the following associations and/or calculations, for example by assigning the energy of each peak to the current explanation of the peak:
Energy $w_{11}$=Energy P1
Energy $w_{1331}$=Energy P2
Energy $w_{1221}$=Energy P3
Energy $w_{122331}+w_{133221}$=Energy P4

Then generating module-part G2 will calculate for each line an approximate attenuation, and will supply the results to the testing module-part T2.

The testing module-part T2 will test these associations and/or calculations by for example comparing attenuations with each other and/or with thresholds, and will generate the following test report:
Attenuation of line 2 differs too much.

Testing module-part T2 will supply this result to debugging module-part D2.

Debugging module-part D2 cannot improve this situation and will send a (P3,P4)=impossible-peak-explanation message to module M1.

Generating module-part G1 will make associations and/or calculations, for example by assigning peaks with reflected waves. Under the condition that P3 cannot be explained as $w_{1221}$ the following solution is proposed:

P1 corresponds with $w_{11}$. This implies that the delay of the first line $$21 = \frac{StartP1}{2} = \frac{12.313}{2} = 6.1565 \text{ μs}$$

as $w_{11}$ travels twice the length of first line 21.

P2 corresponds with $w_{1331}$. This implies that the delay of third line $$23 = \frac{StartP2 - StartP1}{2} = \frac{15.597 - 12.313}{2} = 1.642 \text{ μs}$$

P4 corresponds with $w_{1221}$. This implies that the delay of second line $$22 = \frac{StartP4 - StartP1}{2} = \frac{23.183 - 12.313}{2} = 5.435 \text{ μs}$$

Testing module-part T1 will test these associations and/or calculations by for example checking the number of peaks, the number of associations, the signs etc., and will generate the following test report:

P3 not associated with any waves

Testing module-part T1 will supply said results to debugging module-part D1.

Debugging module-part D1 will debug these results by for example coming up with an association for P3 etc. and will generate the following debug report:

Assign P3 with $w_{133331}$ as the delay=

$$\frac{StartP3 - StartP1}{2} =$$

$$\frac{18.880 - 12.313}{2} = 3.2835 \text{ μs} \approx 2 \cdot 1.642 \text{ μs} = 3.284 \text{ μs}$$

This debugged result is sent back to the testing module-part T1.

Testing module-part T1 will test again now based upon the added and/or adapted associations and/or calculations, and will generate the following test report:

Blanco error report.

Testing module-part will pass the current solution to module M2.

Generating module-part G2 will assign the energy of each peak to the current explanation of the peak:

Energy $w_{11}$=Energy P1
Energy $w_{1331}$=Energy P2
Energy $w_{1221}$=Energy P4
Energy $w_{133331}$=Energy P3

Then generating module-part G2 will supply the results to the testing module-part T2.

The testing module-part T2 will test these associations and/or calculations, and will generate the following test report:

Blanco error report.

Testing module-part T2 will then not need to inform debugging module-part D2 but can directly inform generating module-part G3 (or in other words module M3) about this best possible explanation and will supply the current solution to module M3.

Generating module-part G3 will choose the simulation model parameters (e.g. the parameters of a poly-ethylene cable of 0.4 mm diameter), based on the current solution and the calculated delays and attenuations of each line.

Testing module-part T3 will test these chosen simulation model parameters and come up with a blanco error report.

Then the found solution is passed to module M5 for identifying the signals.

|        | Exact delay [μs] | Estimated delay [μs] | Relative error [%] |
|--------|------------------|----------------------|--------------------|
| Line 1 | 6.0136           | 6.1565               | 2.38               |
| Line 2 | 5.0113           | 5.435                | 8.45               |
| Line 3 | 1.5034           | 1.642                | 9.22               |

For example three out of fifty or one hundred or five hundred rules are shown below:

A. In generating module-part G1 in first module M1:

IF topology=LL THEN peak1 corresponds to wave11 and second peak corresponds to wave1221.

B. In testing module-part T1 in first module M1:

IF exist unassigned peak(s) THEN for each unassigned peak: Add unassigned peak to error list.

C. In debugging module-part D1 in first module M1:

IF third peak is not assigned to any wave THEN assign third peak to wave122221.

Summarizing, interpretation systems (IS) for interpreting reflectometry information are provided with modules (M1, M2) for making interpretations, with each module comprising a generating module-part (G1,G2), a testing module-part (T1,T2) and a debugging module-part (D1,D2), and with one module being a generating system-part for a next module and with said next module being a testing system-part and a debugging system-part for said one module, to introduce improved (for example artificial) intelligence. These interpretation systems (IS) have double-level Generate-Test-Debug-structure or GTD-structures, two at module level as well as one at system level. This improved intelligence can be (further) improved by introducing a third module (M3) resulting in three GTD-structures at module level and two GTD-structures at system level. Interpretations are pulse-based, energy-based, simulation-based for rough, medium, precise interpretation for increasing the efficiency of the improved intelligence.

It should be observed that due to the borderlines between module-parts, modules and system-parts being rather flexible, these terms should not be looked at too narrowly. For example, when considering the G-function, the T-function and the D-function, at module level as well as at system level, without departing from the scope of the invention, parts of each function can be shifted into another function, and each function can partly or entirely be integrated with (another part of) another function. For example, at module level and/or at system level, the T-function and the D-function may be combined into one new T/D-function (like for example a checking function or C-function), in which the T-function and the D-function can no longer be separated from each other, without departing from the scope of this invention, due to this testing functionality and this debugging functionality still being present.

The invention claimed is:

1. Interpretation system for interpreting reflectometry information, characterized in that said interpretation system comprises at least a first module for making a first interpretation and a second module for making a second interpretation, with each module comprising a generating module-part, a testing module-part and a debugging module-part, and with said first module being a generating system-part for said second module and with said second module being a testing system-part and a debugging system-part for said first module.

2. Interpretation system according to claim 1, characterized in that said interpretation system comprises at least a third module for making a third interpretation, with said third module comprising a generating module-part, a testing module-part and a debugging module-part, and with said second module being a generating system-part for said third module and with said third module being a testing system-part and a debugging system-part for said second module.

3. Interpretation system according to claim 2, characterized in that said first interpretation is a pulse-based interpretation, with said second interpretation being an energy-based interpretation, and with said third interpretation being a simulation-based interpretation.

4. Interpretation system according to claim 3, characterized in that said interpretation system comprises at least one processor, with said modules, module-parts and system-parts being software to be run via said at least one processor.

5. Interpretation system according to claim 3, characterized in that said generating module-part of said first module receives measurement-feature information and topology information from a feature extraction and belief network module, with said testing module-part of said first module sending peak-explanation information and line-delay information to said generating module-part of said second module, and with said debugging module-part of said first module sending wrong-topology information and noise information to said feature extraction and belief network module.

6. Interpretation system according to claim 3, characterized in that said testing module-part of said second module sends line-parameter information to said generating module-part of said third module, with said debugging module-part of said second module sending impossible-peak-explanation information to said generating module-part of said first module.

7. Interpretation system according to claim 3, characterized in that said testing module-part of said third module sends line-delay information and/or line-definition information to a signal identification module, with said generating module-part of said third module receiving wrong-solution information from said signal identification module, and with said debugging module-part of said third module sending wrong-parameter-range information to said generating module-part of said second module.

8. An interpretation system for interpreting reflectometry information, comprising:
a first module for making a first interpretation, wherein said first interpretation is a pulse-based interpretation;
a second module for making a second interpretation wherein said second interpretation is an energy-based interpretation,
wherein each module comprises,
a generating module-part,
a testing module-part, and
a debugging module-part, and wherein
said first module is a generating system-part for said second module, and
said second module is a testing system-part and a debugging system-part for said first module; and
at least a third module for making a third interpretation, wherein said third interpretation is a simulation-based interpretation,
wherein said third module comprises,
a generating module-part,
a testing module-part, and
a debugging module-part, and wherein
said second module is a generating system-part for said third module, and
said third module is a testing system-part and a debugging system-part for said second module.

9. Interpretation system according to claim 8, characterized in that said interpretation system comprises at least one processor, with said modules, module-parts and system-parts being software to be run via said at least one processor.

10. Interpretation system according to claim 8, characterized in that said generating module-part of said first module receives measurement-feature information and topology information from a feature extraction and belief network module, with said testing module-part of said first module sending peak-explanation information and line-delay information to said generating module-part of said second module, and with said debugging module-part of said first module sending wrong-topology information and noise information to said feature extraction and belief network module.

11. Interpretation system according to claim 10, characterized in that said testing module-part of said second module sends line-parameter information to said generating module-part of said third module, with said debugging module-part of said second module sending impossible-peak-explanation information to said generating module-part of said first module.

12. Interpretation system according to claim 11, characterized in that said testing module-part of said third module sends line-delay information and/or line-definition information to a signal identification module, with said generating module-part of said third module receiving wrong-solution information from said signal identification module, and with said debugging module-part of said third module sending wrong-parameter-range information to said generating module-part of said second module.

13. Telecommunication system comprising an interpretation system for interpreting reflectometry information, characterized in that said interpretation system comprises at least a first module for making a first interpretation and a second module for making a second interpretation, with each module comprising a generating module-part, a testing module-part and a debugging module-part, and with said first module being a generating system-part for said second module and with said second module being a testing system-part and a debugging system-part for said first module.

14. The telecommunication system according to claim 13, further comprising:
at least a third module for making a third interpretation, said third module comprising:
a generating module-part, a testing module-part, and a debugging module-part,
wherein said second module is a generating system-part for said third module and said third module is a testing system-part and a debugging system-part for said second module.

15. The telecommunication system according to claim 14, wherein:
said first interpretation is a pulse-based interpretation;
said second interpretation is an energy-based interpretation; and
said third interpretation is a simulation-based interpretation.

16. The telecommunication system according to claim 15, further comprising at least one processor, with said modules, module-parts and system-parts being software to be run via said at least one processor.

17. The telecommunication system according to claim 15, wherein:
said generating module-part of said first module receives measurement-feature information and topology information from a feature extraction and belief network module;
said testing module-part of said first module sends peak-explanation information and line-delay information to said generating module-part of said second module; and
said debugging module-part of said first module sends wrong-topology information and noise information to said feature extraction and belief network module.

18. The telecommunication system according to claim 17, wherein:
said testing module-part of said second module sends line-parameter information to said generating module-part of said third module; and
said debugging module-part of said second module sends impossible-peak-explanation information to said generating module-part of said first module.

19. Method for interpreting reflectometry information, characterized in that said method comprises at least:
a first step of making a first interpretation of reflectometry information comprising at least one of a pulse-based interpretation, an energy-based interpretation, and a simulation-based interpretation; and
a second step of making a second interpretation of reflectometry information comprising at least one of a pulse-based interpretation, an energy-based interpretation, and a simulation-based interpretation,
wherein each step comprises a generating substep, a testing substep and a debugging substep, and
wherein said first step is a generating step for said second step and said second step is a testing step and a debugging step for said first step.

20. Processor program product including a tangible computer readable storage medium containing a set of instructions for enabling a processor to perform operations for interpreting reflectometry information, characterized in that said processor program product comprises at least:
a first function of making a first interpretation of reflectometry information comprising at least one of a pulse-based interpretation, an energy-based interpretation, and a simulation-based interpretation; and
a second function of making a second interpretation of reflectometry information comprising at least one of a pulse-based interpretation, an energy-based interpretation, and a simulation-based interpretation,
wherein each function comprises a generating subfunction, a testing subfunction and a debugging subfunction, and
said first function is a generating function for said second function and said second function is a testing function and a debugging function for said first function.

21. An interpretation system, comprising:
first interpretation means for making a first interpretation, said first interpretation means comprising:
first generating means for supplying solution signals,
first testing means for supplying solution and error report signals, and
first debugging means for supplying output information, new solution signals, and correction signals; and
second interpretation means for making a second interpretation, said second interpretation means comprising,
second generating means for supplying solution signals,
second testing means for supplying solution and error report signals, and
second debugging means for supplying output information, new solution signals, and correction signals;
wherein said first interpretation means is generating means for said second interpretation means, and
said second interpretation means is testing means and debugging means for said first interpretation means.

22. An interpretation system according to claim 21, further comprising:
third interpretation means for making a third interpretation, said third interpretation means comprising:
generating means for supplying solution signals,
testing means for supplying solution and error report signals, and
debugging means for supplying output information, new solution signals, and correction signals;
wherein said second interpretation means is generating means for said third interpretation means, and
said third interpretation means is a testing means and a debugging means for said second interpretation means.

23. A processor program product including a tangible computer readable storage medium containing a set of instructions for enabling a processor to perform operations, comprising:
making a first interpretation in a first interpretation module;
supplying output information from the first interpretation module to a second interpretation module;
making a second interpretation in the second interpretation module;
supplying testing and debugging information from the second interpretation module to the first interpretation module; and
outputting information for an output unit.

* * * * *